United States Patent [19]

Dowdell

[11] Patent Number: 4,558,493
[45] Date of Patent: Dec. 17, 1985

[54] VARIABLY ACCESSIBLE BAND CLAMP

[76] Inventor: Ralph Dowdell, 1144 River Rd., Trenton, N.J. 08628

[21] Appl. No.: 565,690

[22] Filed: Dec. 27, 1983

[51] Int. Cl.$^4$ ............................................. B65D 63/02
[52] U.S. Cl. .................................. 24/274 R; 24/483; 411/337; 411/386
[58] Field of Search ................... 24/19, 274 R, 274 P, 24/274 WB, 269, 279, 280, 286, 483, 484; 292/256.65, 256.67; 411/337, 352, 356, 357, 386; 285/252, 253, 420

[56] References Cited

U.S. PATENT DOCUMENTS

| 19,340 | 6/1868 | Gillman . | |
|---|---|---|---|
| 2,374,740 | 5/1945 | Gadow | 411/352 X |
| 2,405,913 | 8/1946 | Tinnerman . | |
| 2,408,347 | 9/1946 | Sprouse . | |
| 2,604,098 | 7/1952 | Kranc . | |
| 2,750,645 | 6/1956 | Seltzer . | |
| 2,938,690 | 5/1960 | Castle . | |
| 3,129,994 | 4/1964 | Harmon et al. . | |
| 4,047,268 | 9/1977 | Buttriss | 24/274 R |
| 4,310,956 | 1/1982 | Meckstroth et al. | 24/279 |

FOREIGN PATENT DOCUMENTS

| 461462 | 6/1928 | Fed. Rep. of Germany | 24/269 |
|---|---|---|---|
| 933013 | 4/1948 | France | 24/274 R |
| 178697 | 3/1962 | Sweden | 24/274 R |
| 2113 | of 1877 | United Kingdom | 411/352 |

Primary Examiner—William E. Lyddane
Assistant Examiner—James R. Brittain
Attorney, Agent, or Firm—Sperry, Zoda & Kane

[57] ABSTRACT

A clamping device is disclosed of band material and including an adjustment device similar to a conventional hose clamp however having a variable accessibility achieved by a drive screw being orientable perpendicular to the conventional drive screw and parallel to the axis of the gripping aperture. The perpendicular drive screw can include a locking tip at the opposite end from the head thereof to facilitate securement within the housing of the adjustment device to facilitate retaining of the screw herein or facilitate removal of the screw therefrom selectively. The housing may include a single or double aperture to facilitate driving of the screw in the opposite direction for tightening or loosening selectively by positioning of the screw. The drive screw can also extend through the opposite side to achieve this same purpose by driving of the conventional drive gear in the opposite direction. In this manner the driving of the adjustment device for tightening or loosening can be achievable from a greater variety of directions which is often necessary in restrictive working areas.

12 Claims, 5 Drawing Figures

U.S. Patent  Dec. 17, 1985  4,558,493
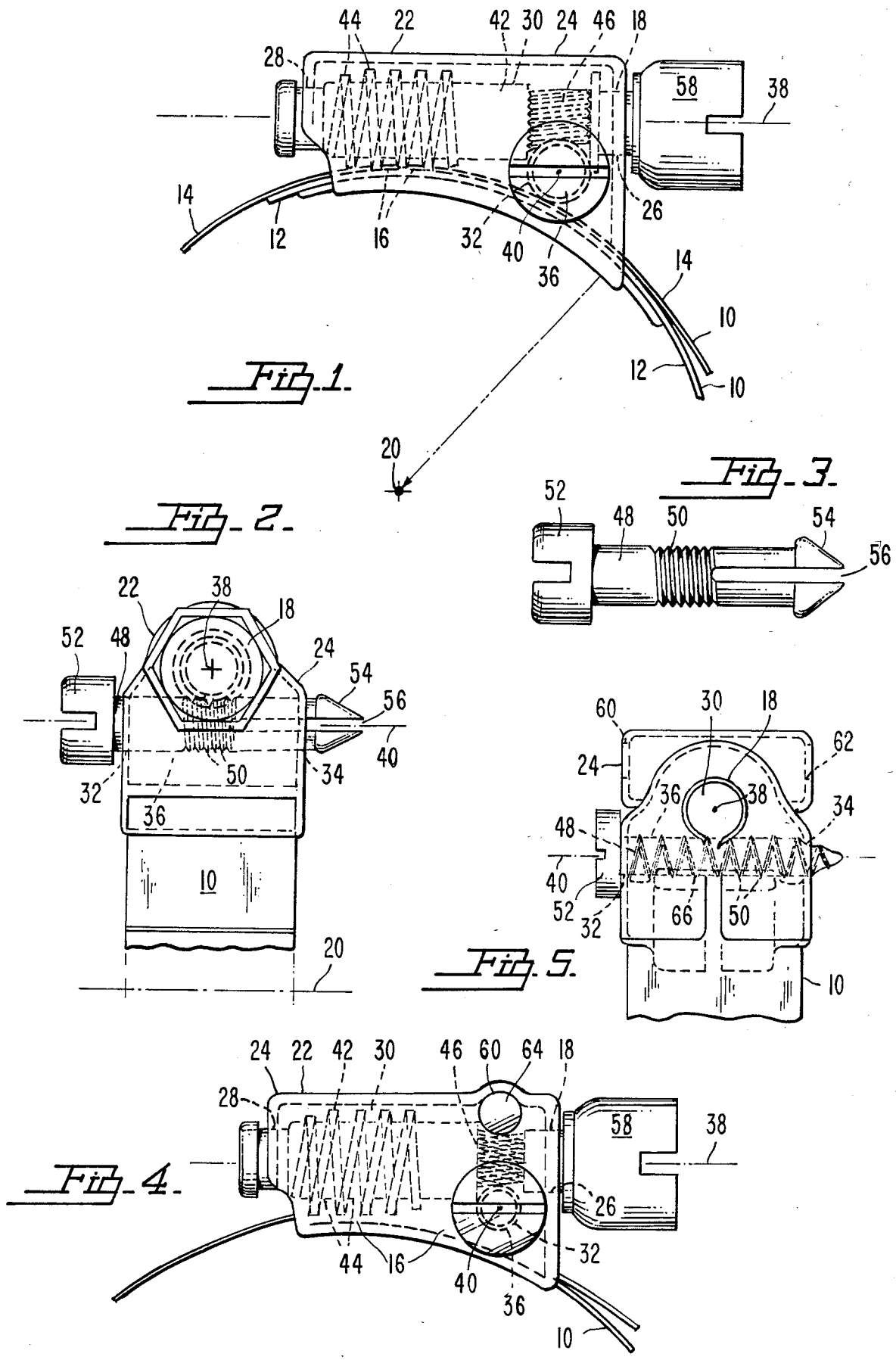

VARIABLY ACCESSIBLE BAND CLAMP

BACKGROUND OF THE INVENTION

1. Field Of The Invention

The present invention relates to the field of hose-type clamps usable for tightening in a circular fashion about tubular conduits or any other device that can utilize such circular tightening or loosening. Such devices are normally used with working devices such as appliances or automobiles wherein restrictive working areas and conditions are often encountered. With these circumstances it is often impossible to tighten or loosen the clamp when provided with a single degree of accessibility. The present invention provides a novel aspect of a more universal accessibility by having a drive screw which can be oriented perpendicularly with respect to the conventional drive screw or could be detachable for selective orientation in either direction perpendicular with respect to the drive screw or at an orientation parallel with respect to the clamping axis but further therefrom.

2. Description Of The Prior Art

Patents have been granted on variably oriented clamping means such as U.S. Pat. Nos. 79,340 patented June 30, 1868 to E. W. Gillman; 2,405,913 patented Aug. 13, 1946 to G. A. Tinnerman; 2,408,347 patented Sept. 24, 1946 to V. E. Sprouse; 2,604,098 patented July 22, 1952 to C. Kranc; 2,750,645 patented June 19, 1956 to R. W. Seltzer; 2,938,690 patented May 31, 1960 to A. B. Castle; and 3,129,994 patented Apr. 21, 1964 to J. R. Harmon et al.

These patents show variable orientations of a drive screw with respect to a clamping assembly. However they do not show the selectively removable nature of the drive mechanism of the present invention which provides an added universality to the accessibility of such clamps.

SUMMARY OF THE INVENTION

The present invention provides a variably accessible clamping means such as a hose clamp which has a band with a first end and a second end extending over one another. The second end includes slots therein which can be gripped for tightening. The first end and second end are actually in abutment with respect to one another in such a manner as to form a circular configuration with a gripping aperture defined therein. An adjustment mechanism is attached with respect to the band to engage the abutting sections of the first and second ends thereof to facilitate adjustment of the relative positioning between the ends of the bands for tightening or loosening of the clamping device.

To facilitate adjustment the present invention includes a housing which is secured with respect to the first end and extends in a tangential orientation with respect to the circumference of the gripping aperture. The housing includes a first adjustment aperture and a second adjustment aperture therein with an adjustment bore extending therebetween. The adjustment bore and the axis thereof are thereby also tangential with respect to the outer circumference of the gripping aperture and are perpendicular with respect to the axis of the gripping aperture. The housing further defines a first drive aperture and a second drive aperture with a drive bore extending therebetween. This drive bore will extend perpendicularly with respect to the axis of the adjustment bore and parallel with respect to the axis of the gripping aperture.

An adjustment screw is rotatably secured within the housing extending through the first adjustment aperture and the second adjustment aperture. This adjustment screw will include an adjusting thread thereon which is positioned such as to be in engagement with respect to the slots in the band means of the second end of the band and is responsive to rotation to urge the second end of the band means to move with respect to the first end of the band means for tightening or loosening in accordance with which ever direction the adjustment screw is being rotated. In this manner the size of the gripping aperture will be variable. An adjustment gear means is also positioned about the adjustment bore means in a position adjacent to the drive bore and in a position adjacent to a secondary drive bore if included.

A drive screw is positioned extending through said drive bore and is capable of rotational movement therein. This drive screw thereby also extends through the first drive aperture and the second drive aperture and includes a drive screw thread means thereon positioned in engagement with respect to the adjustment gear on the adjustment screw. In this manner rotation of the drive screw will cause rotation of the adjustment screw for tightening or loosening of the clamp.

A head should preferably be included on the drive screw to facilitate rotation thereof. Also a tip means should preferably be included at the tip end of the drive screw opposite from the drive head. This tip means will facilitate locking of the drive screw in place extending through the drive bore or through the secondary drive bore. The tip means therefore must be somewhat larger than the size of the second drive aperture in order to retain the drive screw in place. To facilitate removal and replacement of the drive screw a tip slot means within the tip means should be included which allows the tip means to be compressed and the drive screw removal or replacement thereby facilitated.

The drive screw means may extend through the drive bore with the head adjacent to the first drive aperture or alternatively in the opposite direction with the head thereof positioned adjacent to the second drive aperture. Also it is possible for a secondary drive bore to be positioned adjacent to the adjustment gear but at the diametrically opposite position from the drive bore. In this manner clockwise or counterclockwise rotation of the drive screw can be achieved by a variety of positions of the drive screw depending upon the particular accessibility thereof. The drive screw itself if it does not have a slotted or retaining tip means could also be a simple sheet metal screw which can be positioned through the various holes or in the various directions there to control whether the clamping means is being loosened or tightened. Also the adjustment screw can include a conventional adjustment screw head if that particular direction is accessible in a particular application. Preferably the band is of metal material.

It is an object of the present invention to provide a clamping means having a greater variablity of accessibility.

It is an object of the present invention to provide a clamping means which allows tightening or loosening thereof by a drive screw oriented perpendicularly with respect to the plane of the band means thereof and parallel with respect to the axis of the gripping aperture.

It is an object of the present invention to provide a clamping means having an adjustment means which has an aperture therein into which a removable drive screw can be placed in one of two orientations.

It is an object of the present invention to provide a variably accessible clamping means with a detachable drive screw which is easily retained and easily removed by way of a compressible slot means defined in the tip thereof.

It is an object of the present invention to provide a variably accessible clamping means capable of being driven by a conventional sheet metal screw.

It is an object of the present invention to provide a variably accessible clamping means which may include two adjustment bores capable of driving an adjustment screw for tightening or loosening selectively depending upon which aperture is used and which orientation of the drive screw is utilized.

It is an object of the present invention to provide a variably accessible clamping means which is easily maintained and reliable in usage.

It is an object of the present invention to provide a variably accessible clamping means which is minimal expense.

It is an object of the present invention to provide a variably accessible clamping means which is of simple yet reliable construction.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a front cross sectional view of an embodiment of the variably accessible clamping means of the present invention;

FIG. 2 is a side cross sectional view of the embodiment shown in FIG. 1;

FIG. 3 is a side cross sectional view of an embodiment of the drive screw means of the embodiment of the present invention shown in FIG. 1;

FIG. 4 is a front cross sectional view of an alternative embodiment of the present invention; and FIG. 5 is a side cross sectional view of a further alternative embodiment of the present invention.

DETAILED DESCRIPTION OF THE PREFERRED EMBODIMENT

The present invention provides a variably accessible clamping means for use when any type of circular clamping action is required and includes a band means 10 which extends in generally circular configuration such that a first end 12 and a second end 14 thereof overlap one another. Second end 14 preferably includes a plurality of slot means 16 defined therein.

In this manner the band means 10 will define a gripping aperture means 18 therein of the generally circular shape having a gripping axis 20 which is defined normal to the plane of extension of band means 10.

An adjustment means 22 is positioned extending about the overlapped first and second ends 12 and 14 of band means 10 and particularly include the housing means 24 extending therearound. Housing means 24 defines a first adjustment aperture means 26 and a second adjustment aperture means 28 extending therethrough. These two adjustment apertures are connected by an adjustment bore means 30 therebetween. The central axis of adjustment bore 30 is oriented tangentially with respect to a circumference of the circle formed by the band means 10. An adjustment screw means 42 may take the form of a conventional screw member having a thread means 44 extending therealong. Adjustment screw means 42 is positioned extending in adjustment bore means 30 through first adjustment aperture means 26 and second adjustment aperture means 28. The adjustment screw means 42 is capable of rotational movement therein and the adjustment thread means 44 at the exterior thereof are positioned in engagement with respect to the slot means 16 of band means 10. In this manner as viewed in FIG. 1 when the adjustment screw means 42 is rotated in a clockwise direction it will cause the second end 14 of band means 10 to move toward the rightward direction causing tightening of the gripping means. Alternatively a counterclockwise rotation will cause loosening of the gripping means. This is a conventional configuration. However the present invention includes an adjustment gear means 46 about the periphery of said adjustment screw means 42. Also housing means 24 defines a first drive aperture means 32 and a second drive aperture means 34 therein having a drive bore means 36 extending from the first drive aperture means 32 to the second drive aperture means 34. The drive bore means 36 is oriented with the drive bore axis 40 thereof oriented perpendicularly with respect to the adjustment bore axis 38 of the adjustment bore 30. Also the drive bore axis 40 is oriented parallel with respect to the gripping axis 20.

In this manner a drive gear screw means 48 having a drive screw thread means 50 extending therearound when placed in the desired position extending through the drive bore means 36 will cause the thread means 50 thereof to engage the adjustment screw means 42. This is best shown in FIGS. 1 and 2. In this manner as the drive screw means 48 is rotated the engagement between the drive screw thread means 50 and the adjustment gear means 46 will cause the adjustment screw means to similarly rotate in the desired direction causing tightening or loosening of the gripping means as required.

To facilitate rotation of the drive screw means a drive head means 52 may be located at one end thereof.

To facilitate mounting of the drive screw means 48 within the drive bore means 36 a tip means 54 may be positioned on the opposite end of said drive screw means 48 from the drive head means 52. This tip means may be slightly larger than the diameter of the first and second drive aperture means and may include a tip slot means 56 in the tip means 54 thereof in such a manner that the tip means can be made smaller by compressing of the tip slot to allow removal or replacement of the drive screw means 48 with respect to the drive bore means 36. Also when not compressed the sides of the tip means 54 will cause the drive screw means 48 to be retained within the drive bore means 36 in a retained fashion yet still allowing rotational movement thereof.

To provide more variability in the accessibility of the present invention it is entirely possible that the conventional adjustment screw head means 58 of a conventional hose clamp may also be included in case that area is accessible the perpendicular drive screw is not accessible.

Also a third drive aperture means 60 and a fourth drive aperture means 62 may be further defined by the housing means 24 in such a manner as to define a secondary drive bore means 64 extending therebetween. This configuration is an alternative construction shown in FIG. 4 with the second drive bore means positioned in the housing above the adjustment gear means 46 whereas the drive bore means 36 is positioned below adjustment gear means 46. In this manner if only one side of the clamp is accessible a screw could be placed in the drive bore means 36 for tightening and in the secondary drive bore means 64 for loosening. This is particularly usable in a configuration wherein the drive screw means 48 takes the form of a sheet metal screw 66 as in the configurations shown in FIGS. 4 and 5.

The drive screw means 48 of the present invention can take the form of the preferred embodiment displayed in FIG. 3. In that configuration the drive head means 52 is shown with the tip means 54 in the tip slot means 56. When used in combination with the configuration in FIG. 2 we see that the drive screw means 48 may be inserted through the first drive aperture means 32 and through the drive bore means 36 such that the tip means 54 thereof extends through the second drive aperture means 34. As pressed inward the tip slot means 56 will be compressed and the tip means 54 will then snap outwardly causing the drive screw means 48 to be locked in place with the tip slot means 56 assuming the open position. Alternatively if that screw is designed to be removed the tip slot means 56 can be compressed and the tip means 54 will be small enough to pass outwardly through the drive bore means 36. In this manner that screw drive means can also be used with the housing configuration shown in FIG. 4 if so desired such as if the lower or primary drive bore means 36 were inaccessible whereas the secondary drive bore means 64 were accessible for a particular application. Alternatively if the first and second drive aperture means were each of the same size then the configuration of a drive screw means shown in FIG. 3 could be inserted with the head thereof in four possible locations with the configuration shown in FIG. 4, that is with the head of the drive means positioned adjacent to first drive aperture means 32 or second drive aperture means 34 or third drive aperture means 60 or fourth drive aperture means 62. This provides four alternative directions and positions of access.

Alternatively if the more simple configuration of a sheet metal screw as shown in FIG. 5 is being utilized the same four alternatives are possible but certainly with a sheet metal screw they are more likely required since it must be placed through one bore for tightening and then should be placed through the same bore in the opposite direction or alternatively through the other bore if provided as in FIG. 4 for loosening. This is possible since the sheet metal screw has no tip means 54 to prevent that screw from being pulled out of the housing when it is rotated in the counterclockwise direction.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A variably accessible clamping means comprising:
    (a) a band means defining a first end and a second thereof, said band means including a plurality of slot means defined therein, said first end and said second end thereof being in slideable engagement with respect to one another to form said band means into a circular configuration to define a gripping aperture means therethrough and defining a gripping axis therethrough;
    (b) an adjustment means attached with respect to said band means to engage the slideably engaged sections of said first end means and adjust the relative positioning thereof, said adjustment means comprising:
        (1) a housing means secured with respect to said first end means and extending tangentially with respect to said gripping aperture means, said housing means defining a first adjustment aperture means and a second adjustment aperture means therethrough which define an adjustment bore means extending therethrough in tangential orientation with respect to said gripping aperture means and perpendicularly with respect to said gripping axis, said housing means further defining a first drive aperture means and a second drive aperture means with a primary drive bore means extending therebetween in a direction perpendicularly with respect to the axis of said adjustment bore means and parallel with respect to said gripping axis, said housing means further defining a third drive aperture means and a fourth drive aperture means with a secondary drive bore means extending therebetween in a direction perpendicularly with respect to the axis of said adjustment bore means and parallel with respect to said gripping axis said secondary drive bore means extending adjacent to said adjustment gear means at a position diametrically opposite from said primary drive bore means;
        (2) an adjustment screw means rotatably secured in said housing extending through said first adjustment aperture means and said second adjustment aperture means, said adjustment screw means including adjustment thread means thereon positioned in engagement with respect to said band slot means of said second end and responsive to rotation thereof to urge said second end of said band means to move with respect to said first end thereof to adjust the size of said gripping aperture means, said adjustment screw means further including an adjustment gear means therearound positioned adjacent to said drive bore means; and
        (3) a drive screw means rotatably, securable in said housing and being positionable extending through one of said primary drive bore means and said secondary drive bore means, said drive screw means including drive screw thread means thereon positioned in engagement with respect to said adjustment gear means and responsive to rotation of said drive screw means to cause rotation of said adjustment screw means.

2. The variably accessible clamping means as defined in claim 1 wherein said drive screw means includes a drive head means.

3. The variably accessible clamping means as defined in claim 2 wherein said drive screw means include a tip means at the opposite end of said drive head means, said tip means being larger than said second drive aperture means and being larger than said fourth drive aperture means to retain said drive screw means extending through said housing while allowing rotational movement thereof with respect to said housing means.

4. The variably accessible clamping means as defined in claim 3 wherein said drive screw means includes a tip slot means within the tip means thereof to allow said tip means to be compressed and drive screw means selectively removed and replaced extending through said housing means.

5. The variably accessible clamping means as defined in claim 2 wherein said drive screw means is oriented extending through said primary drive bore means with said drive head means adjacent said first drive aperture means.

6. The variably accessible clamping means as defined in claim 2 wherein said drive screw means is oriented extending through said primary drive bore means with said drive head means adjacent said second drive aperture means.

7. The variably accessible clamping means as defined in claim 2 wherein said drive screw means is oriented extending through said secondary drive bore means with said drive head means adjacent said third drive aperture means.

8. The variably accessible clamping means as defined in claim 2 wherein said drive screw means is oriented extending through said secondary drive bore means with said drive head means adjacent said fourth drive aperture means.

9. The variably accessible clamping means as defined in claim 1 wherein said drive screw means comprises a sheet metal screw.

10. The variably accessibly clamping means as defined in claim 1 wherein said adjustment screw means includes an adjustment screw head means.

11. The variably accessibly clamping means as defined in claim 1 wherein said band means is of metal.

12. A variably accessible clamping means comprising:
(a) a band means defining a first end and a second end thereof, said band means including a plurality of slot means defined therein, said first end and said second end thereof being in slideable engagement with respect to one another to form said band means into a circular configuration to define a gripping aperture means therethrough and defining a gripping axis therethrough;
(b) an adjustment means attached with respect to said band means to engage the slideably engaged sections of said first end means and said second end means and adjust the relative positioning thereof, said adjustment means comprising;
(1) a housing means secured with respect to said first end means and extending tangentially with respect to said gripping aperture means, said housing means defining a first adjustment aperture means and a second adjustment aperture means therethrough which define an adjustment bore means extending therethrough in tangential orientation with respect to said gripping aperture means and perpendicularly with respect to said gripping axis, said housing means further defining a first drive aperture means and a second drive aperture means with a primary drive bore means extending therebetween in a direction perpendicularly with respect to the axis of said adjustment bore means and parallel with respect to said gripping axis, said housing means further defining a third drive aperture means and a fourth drive aperture means with a secondary drive bore means extending therebetween in a direction perpendicularly with respect to the axis of said adjustment bore means and parallel with respect to said gripping axis, said secondary drive bore means extending adjacent to said adjustment gear means at a position diametrically opposite from said primary drive bore means;
(2) an adjustment screw means rotatably secured in said housing extending through said first adjustment aperture means and said second adjustment aperture means, said adjustment screw means including adjustment thread means thereon positioned in engagement with respect to said band slot means of said second end and responsive to rotation thereof to urge said second end of said band means to move with respect to said first end thereof to adjust the size of said gripping aperture means, said adjustment screw means further including an adjustment gear means therearound positioned adjacent to said drive bore means; and
(3) a drive screw means rotatably securable in said housing and being positionable extending through one of said primary drive bore means and said secondary drive bore means, said drive screw means including a drive head means, said drive screw means including a drive screw thread means thereon positioned in engagement with respect to said adjustment gear means and responsive to rotation of said drive screw means to cause rotation of said adjustment screw means, said drive screw means including a tip means at the opposite end of said drive head means, said tip means being larger than the size of said second drive aperture means and being larger than said fourth drive aperture means to retain said drive screw means extending within said housing while allowing rotational movement thereof with respect to said housing means, said drive screw means further including a tip slot means within the tip means thereof to allow said tip means to be compressed and allowing said drive screw means to be selectively removed and replaced extending through one of said primary drive bore means and said secondary drive bore means.

* * * * *